United States Patent [19]

Berkowitz et al.

[11] 4,311,878

[45] Jan. 19, 1982

[54] DIALING INTERVAL TRANSMISSION GATING ARRANGEMENT

[75] Inventors: Paul R. Berkowitz, Red Bank; Thomas M. Quinn, Little Silver; David C. Trimble, Holmdel; Tse L. Wang, Matawan, all of N.J.

[73] Assignee: Bell Telephone Laboratories, Incorporated, Murray Hill, N.J.

[21] Appl. No.: 53,780

[22] Filed: Jul. 2, 1979

[51] Int. Cl.[3] .......................................... H04M 1/40
[52] U.S. Cl. ............................. 179/16 EC; 179/170 R
[58] Field of Search .......... 179/16 A, 16 AA, 16 EC, 179/18 AD, 18 BC, 84 VF, 170 R

[56] References Cited

U.S. PATENT DOCUMENTS

| | | | |
|---|---|---|---|
| 3,350,509 | 10/1967 | Lee et al. | 179/18 AD |
| 3,484,558 | 12/1969 | Roscoe | 179/16 EC |
| 3,818,144 | 6/1974 | Druyff et al. | 179/16 EC |
| 3,821,484 | 6/1974 | Sternung et al. | 179/84 VF |
| 3,835,259 | 9/1974 | Medill et al. | 179/18 BC |
| 3,983,332 | 9/1976 | Patten | 179/18 BC |
| 4,113,989 | 9/1978 | Schneider | 179/18 AD |
| 4,150,259 | 4/1979 | Fenton et al. | 179/18 BC |
| 4,233,475 | 11/1980 | Roche | 179/16 EC |

OTHER PUBLICATIONS

"MF Tone to Pulse Converter Circuit"; Mitel, Inc. Technical Brochure.

Primary Examiner—Bernard Konick
Assistant Examiner—Randall P. Myers
Attorney, Agent, or Firm—David H. Tannenbaum

[57] ABSTRACT

A transmission arrangement for use in a customer premises communication system is operable for controlling transmission during the MF digit signaling interval in situations where it is necessary to convert station dialed MF signals to pulsed digit signaling. In systems where the signaling station, the MF to dial pulse converter and the Central Office or PBX line are bridged on the same communication link it is possible for the station's MF signals to be detected by the MF receiver in the Central Office, thereby causing errors in the received digits. These problems are eliminated by inserting two transmission gates in the four-wire portion of the CO line. The gates are controlled by the processor in the customer premises communication system such that the outward gate is opened immediately upon seizure of the line by the calling station and remains open during the entire dialing interval. The inward gate is opened concurrently with the operation of the digit outpulsing relay and remains operated on a digit by digit basis.

9 Claims, 3 Drawing Figures

DIALING INTERVAL TRANSMISSION GATING ARRANGEMENT

FIELD OF THE INVENTION

This invention relates to a transmission arrangement for controlling communication signals between a central switch and a local communication system.

BACKGROUND OF THE INVENTION

In some communication systems, a common bus is used for establishing communication connections. Such a system is shown in U.S. Pat. No. 4,150,259 dated Apr. 17, 1979 which patent is incorporated herein by reference as if it had been reproduced in full. In such systems when a call is to be established the calling station becomes connected to an assigned link. If the call is one which is directed to a separate switching network a connection is made to that network via a central office or PBX line. That line is then also connected to the same assigned link. The calling station then dials, using the dual tone multifrequency (hereinafter referred to as MF tones) key pad at the local station, and the MF tone signals are communicated to the central office via the common connection on the assigned link.

The MF dialing at the station set consists of a series of bursts of MF signals of widely variant duration and spacing which correspond to button depressions on the telephone dial. These are delimited by periods of silence or the absence of MF signals. Each valid MF signal burst is registered by a MF receiver as a dialed digit. In the modern communication system, these digits are collected for interpretation by a common control circuit. The transmission path from station set to MF receiver is established via a voice switching network in the communication system.

Problems result, however, when the central office switching machine is one which accepts only rotary dialed (pulsed) digits. These problems are compounded when the central switching machine can accept a mixture of rotary dialed and tone signalled digits.

Primarily, the problems come about because the local communication system, which receives MF tones from the stations, converts the tones into conventional pulsed digits. In such situations the tip and ring leads of the Central Office line are pulsed by a relay contact placed in the communication path. The relay operates under control of the local communication system processor. Thus, if the central office switching machine is one where both tone and rotary pulsed signals are accepted then the local system pulsing relay serves to periodically interrupt the tone of each digit, (as received from the station), thereby sending false digits to the central office.

For example, assume the tones for the digit four are placed on the line by the station. Also assume that the local communication system is arranged to pulse the central office line by opening and closing (pulsing) the transmission line four times in response to the received digit four. Then, in such a condition, the central office (which accepts tone signals) will register four occurrences of the digit four. If a five were being transmitted then the central office would see five fives. The reason for the multiplicity, of course, is the fact that the digit pulsing relay interrupts the tone signal and the central office electronic detectors respond fast enough to record multiple digits.

In addition, the fact that a relay in the line circuit is pulsing causes transient problems in the local MF tone receiver, as discussed below.

One solution to the problem is to isolate the line from the station during the transmission interval so that the false tone signals would not be sent forward to the central office and so that the transient signals would not be sent back to the local stations. However, this is not possible since there are situations during the dialing interval where it is mandatory for the calling subscriber to hear call progress tones from the central office. One example of this necessity is where the subscriber dials an access code and must wait to hear a second dial tone from the central office before dialing the remainder of the digits.

Attempts to, in some way, interrupt the transmission path between station set and CO solely during periods of MF dial button depression are complicated by the asynchronous nature of dialing. The first evidence of button depression, being the output of a digit to the common control circuit from the MF receiver, occurs after the unwanted MF signal has also been transmitted to the CO. In some prior art arrangements the transmission path to the CO interface is routed in tandem through the MF receiver which, independent of the common control circuit, provides a rapid dissolution of the network path to the CO interface when MF signals are present, or, when, as will be described below, outpulsing is occurring. This method has the disadvantage of requiring two separate network paths during the dialing period with the penalty of reduced network traffic capacity.

A second problem, characteristic of rotary dialing, arises in this conference configuration. In the loop start or ground start signaling traditionally used on CO lines and trunks, dial pulsing is performed by interrupting the flow of DC current normally present in the CO loop during the active or "off-hook" state. A loop closure relay in the CO interface, controlled by the common control circuit, establishes DC continuity to the CO loop. Dial pulses are produced by opening this relay for specified "break" intervals. The number of consecutive break intervals is equal to the value of the digit being dialed. The break intervals are delimited by "make" intervals which are periods of relay closure. Short make intervals signify the concatenation of break pulses within a digit while longer make intervals signify the conclusion of a digit.

The transitions from make to break and vice versa create large amplitude clicks at the CO loop input to the CO interface circuit. The voice-band frequency components of these clicks are naturally transmitted to the MF receiver and station set through the voice switching network. At the receiver, they may cause mutilation of the MF signals which are simultaneously being received. At the station set, these clicks are annoyingly loud and may disturb the station set user. It is necessary, therefore, to inhibit the transmission path inward from the CO interface to the voice switching network during the outpulsing operation and to restore this path as soon as possible upon conclusion of outpulsing so that the station user may receive call progress tones from the CO.

SUMMARY OF THE INVENTION

The foregoing problems are overcome by arranging the central office line interface with a dial pulse relay in the two wire portion of the line and by separating the transmission on the line into four wire operation. Transmission gates, are inserted into each directional leg of the four wire path, with the gate in each leg separately controllable. The central processor of the local communication system is arranged to open the outward gate during the entire dialing sequence so that MF digits dialed from the station are inhibited from reaching the central office. The central processor then converts the received MF digits into dial pulses and operates the dial pulse loop relay to repeat the digits forward. The inward directed gate is opened only during the actual time digits are being transmitted and for a timed portion during the interdigital timing interval. If the interdigital time period is longer than a certain fixed time then the inward gate closes allowing any central office signal to pass through to the local communication system.

Thus, it is one feature of our invention to separate the inward transmission from the outward transmission and to treat each transmission direction separately.

It is another feature of our invention that a two wire transmission line is separated into four wire operation and transmission gates are inserted in each transmission leg of the four wire path, each gate being controlled by the local system processor.

BRIEF DESCRIPTION OF THE DRAWING

The principles of our invention as well as additional objects and features thereof will be more fully appreciated from a review of the illustrative embodiment shown in the drawing in which.

DETAILED DESCRIPTION

Figure 1:
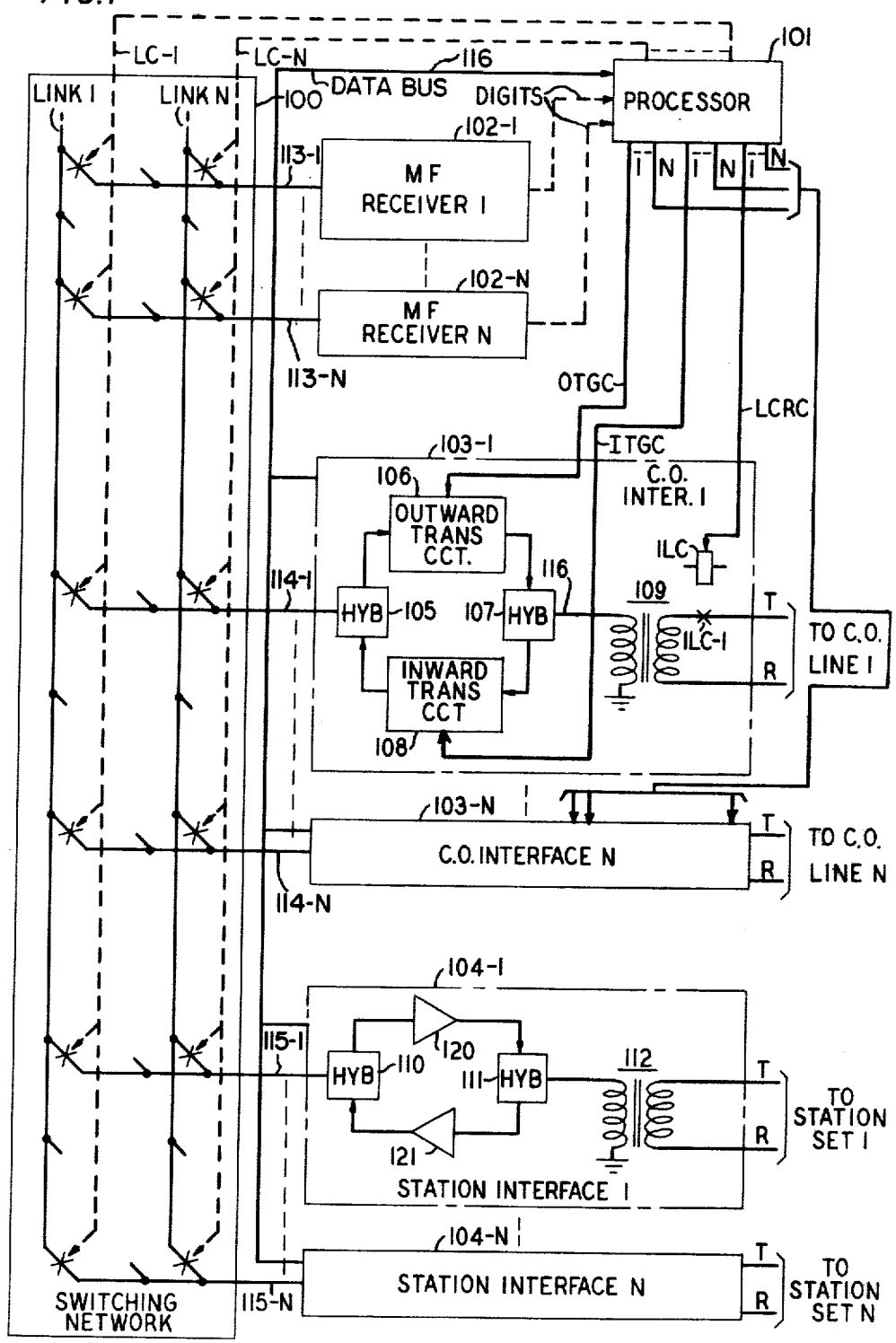
FIG. 1 shows a block diagram of a portion of a switching system using our invention.

FIG. 1 schematically shows a part of a communication system architecture that is relevant to this invention. A CO, PBX, or other communication system interface such as interface 103-1 provides access to the local communication system for Central Office (CO) trunks or lines which use loop start signaling. Signaling to the central office or PBX utilizes a loop closure relay 1 LC which establishes DC continuity in the tip T and ring R loop to the CO when the relay is operated. Contacts 1 LC-1 also serves to interrupt the DC path when the relay is unoperated. The presence of DC is used to signal the office of an active or off hook state at the communication system interface. Rotary dial pulsing into the office is performed by repetitively interrupting the DC path to generate a train of break pulses. Transformer 109 in conjunction with hybrid 107 provides isolation between the loop and system electronics and converts the two-wire tip and ring CO line circuit to a four-wire circuit within the system. Transmission gates 106 and 107 provide amplification and transmission gating. Hybrid 105 recombines the two directions of transmission into an unbalanced two-wire circuit 114. Station interface 104 provides access to the communication system for a local system telephone station set such as station set 1 (not shown). Transformer 112 provides isolation and conversion between the balanced and unbalanced circuits. Station hybrids 110 and 111 are, for purposes of this discussion, identical with hybrids 105 and 107 respectively. Station interface inward and outward transmission circuits 121 and 120 provide amplification, but, unlike the CO interface, they contain no transmission gates.

MF receivers 102-1 to 102-n are service circuits which detect and decode MF signals on any network access line 113-1 to 113-n. Link type space division switching network 100 is used to establish bidirectional transmission paths between system interfaces and service circuits. Crosspoint switches provide access for network horizontals 113-, 114-, 115-, to links 1 through 4. Two or more horizontals may be connected together through the switching network by closing the appropriate crosspoint switches under control of processor 101 to assign them to a common link. Control for loop closure relays 1 LC, outward transmission gates (OTGC), inward transmission gate (ITGC), and for the network crosspoints LC emanates from common control circuitry such as processor 101. Processor 101 also receives, for interpretation, digits collected by the MF receiver. Processor 101 communicates with other elements of the system via common paths, shown in dotted form and with the interface circuits via data bus 116. This operation is shown in aforementioned U.S. Pat. No. 4,150,259 (the data bus therein is labeled 101).

SYSTEM OPERATION

When a calling subscriber goes off-hook on a CO line call the processor operates, in the well-known manner to connect the station, an available CO interface circuit and an available MF receiver to a selected link of the local switching network. The MF receiver acts to accept any MF dialed digits and to pass the information to processor 101. Before the first digit is dialed the CO trunk must be "requested" to provide dial tone and a dial pulse (or MF) register. The local communication system performs this function by closing loop relay 1 LC under control of processor 101. The state of inward transmission gate 108 in the CO interface is not critical prior to the seizure of the CO register. At the on-hook to off-hook transition of the loop relay, inward transmission gate 108 is closed also under control of processor 101 so that dial tone may be received by the local station user. Outward transmission gate 106 is opened so that station MF dialing tones are inhibited from reaching the CO.

Figure 3:
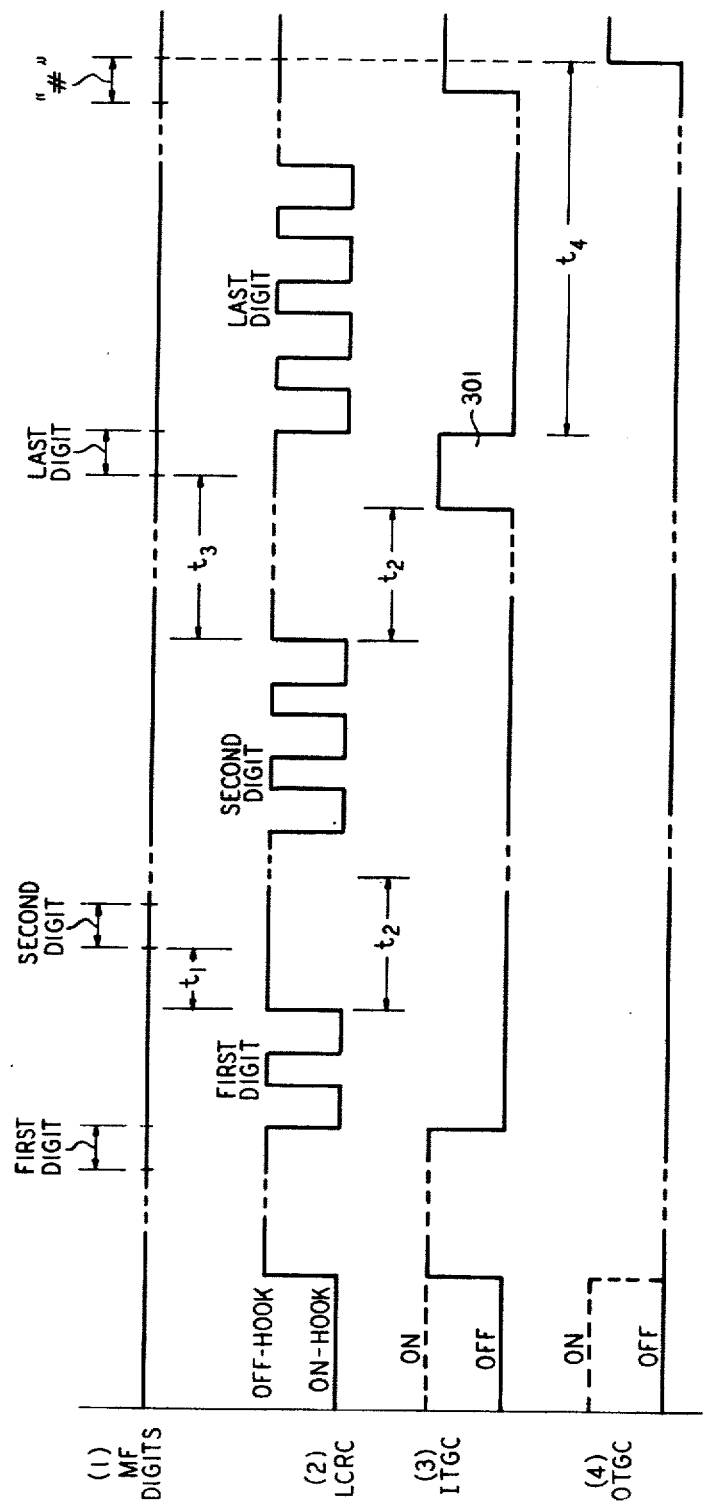
FIG. 3 is a timing chart showing the interrelationship of the various dial pulses and signal.

After an arbitrary interval, the first MF digit is dialed from the station. At the onset of the tone burst the digit is recognized by the attached MF receiver and processor 101 and outpulsing begins. Loop closure relay 1 LC in the selected line interface circuit is pulsed open and closed a number of times corresponding to the digit being dialed. Turning to FIG. 3, the relationship of the timed pulses can be seen. Top line (1) shows the MF digits being sent by the local station, while line (2) shows the signals for the pulsing relay. Line (3) shows the signals for the inward transmission gate while line (4) shows the signals for the outward transmission gate. At the start of the first pulse train, before the break pulse, the inward transmission gate is opened. This prevents clicks caused by the relay operation from being received by the station and by the local MF receiver. Inward transmission remains disabled for a period of time t2 into the interdigital period following the outpulsing of the digit. This serves to guard against transients generated by the CO switching equipment which may occur after a digit is received. If the time t1 between the end of a pulsed digit and the occurrence of a new MF digit is less than this guard interval (t2) then the inward transmission is not restored at all between outpulsed digits. This is shown for digits one and two. For proper operation, a prescribed period of time must elapse before the start of the outpulsing of the second digit. If the second MF digit is received in less than this minimum interdigital interval the second MF digit is buffered by the common control circuit. In principal, several MF digits may be buffered and queued for outpulsing. In the situation shown for the last digit, time t3 between the end of outpulsing of the prior digit and the occurrence of a new MF digit exceeds the guard interval t1 thereby resulting in inward transmission being temporarily restored (as shown by pulse 301 line (3) FIG. 3) prior to the outpulsing of the last digit during time t4. Presumably, the pause in the MF stream represents an attempt by the station user to obtain a call progress indication from the CO and the inward transmission is restored so that the call progress tones may be heard. A typical interdigital time might be 600 msec while a suitable guard interval might be one second.

Outward transmission (as shown on line (4) FIG. 3) remains disabled during the entire dialing sequence beginning with the seizure of the CO line since there is no sure way to anticipate when the station user may press a button on the MF dial. At the end of dialing, outward transmission is restored under control of processor 101. The end of dialing is signaled to the common control circuit in one of three ways. The most rapid way for the station user to signal the end of dialing and have outward transmission restored is to dial the delimiter "#". To protect against the case where the station user is untrained in the use of the special delimiter character, outward transmission is restored automatically at the end of a timeout interval t4. The timing period for automatic restoration of outward transmission begins on the reception of the last MF digit, and is independent of pending outpulsing operations. The assumption is that the station user will not pause for that long in his/her dialing until the entire number is dialed. A sophisticated strategy might count the number of digits that have been dialed by the station user. If, for instance, a local call requires seven digits then a long timeout could be required prior to the dialing of the seventh digit. A shorter timing period could be used following the seventh digit. Suitable timeout periods might be 10 seconds for the long case and five for the short.

Figure 2:
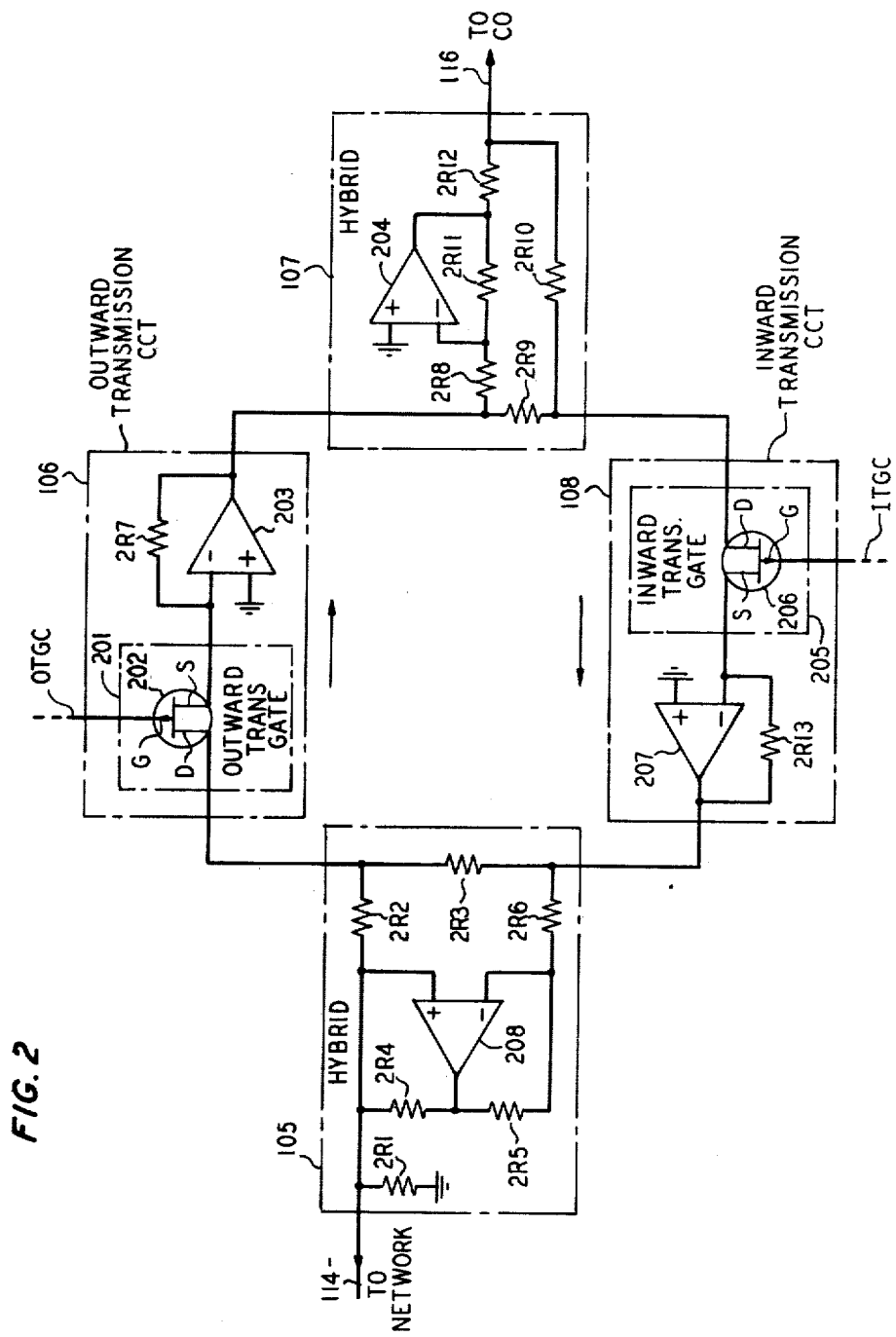
FIG. 2 is a detailed block diagram of the arrangement of the hybrid circuits and transmission control gates.

Since the restoration of outward transmission is identified with the end of dialing it is also possible for the communication system to remove the MF receiver from the conference configuration with the station and CO interfaces. This frees the receiver to be used by other callers. In FIG. 2 there is shown one implementation of the transmission gates for inward and outward transmission control. As can be seen transmission arrives from the CO and is provided to the network by a two-wire circuit 116 and 114, respectively. Note that while only one wire of the two-wire circuits is shown this is commonly referred to as the unbalanced condition. Hybrids 105 and 107 serve to separate the unbalanced two-wire circuit into an unbalanced four-wire circuit where outward transmission is directed through outward transmission circuit 106 while inward transmission is directed through inward transmission circuit 108. On the two-wire portions of the circuit 114 and 116, transmission is bidirectional.

Amplifier 204 of hybrid 107 delivers signal power into the central office loop. Resistor 2R12 provides the terminating impedance for the central office loop. Amplifier 204 also provides a phase inversion. Resistor 2R9 and 2R10 sum the input from outward transmission circuit 106 together with the inverted version of the signal from amplifier 204 so as to cancel the signal and prevent it from being transmitted back toward inward transmission circuit 108. This is the well known hybrid function. Resistor 2R10 also serves the purpose of providing a signal from the CO to inward transmission circuit 108. It should be understood that hybrid 107 is one of many hybrids well known in the art which serves to convert unbalanced two-wire operation to unbalanced four-wire operation where one leg of the four-wire circuit contains transmission in one direction while the other leg provides transmission in the opposite direction.

Hybrid 105 provides a current to the network in proportion to the signal received from inward transmission circuit 108. At the same time, hybrid 105 receives a voltage signal from the network and provides that signal via resistor 2R2 to the input of outward transmission circuit 106. Resistors 2R2 and 2R3 serve as the summing resistors in conjunction with the phase-inversion of amplifier 208 to prevent signals arriving from inward transmission circuit 108 from being reflected back to outward transmission circuit 106. The operation of hybrid 105 in conjunction with amplifier 207 of inward transmission circuit 108 is constructed to take advantage of the interface properties of the monobus interface circuit disclosed in U.S. Pat. No. 3,991,279 which patent is hereby incorporated by reference as if fully reproduced herein. Outward transmission circuit 106 serves to block or amplify outward direct transmission under control of a signal on lead OTGC which signal is provided from the common control circuit such as processors 101 shown in FIG. 1. For purposes of discussion it will be assumed that when outward transmission gate 201 is turned on, communication transmission will flow through outward transmission circuit 106 and conversely when outward transmission gate 201 is turned off, transmission will be inhibited. Inward transmission circuit 108 operates in the same manner as does outward transmission circuit 106 and is operable to block or amplify transmission from the CO to the network under control of signals on lead ITGC from processor 101. Elements 202 and 206 of the transmission gates are p-channel junction field effect transistors (FETs). The FETs are used in this configuration as a bi-state device having an on condition with substantially zero resistance between the drain and source leads. When the FET is off, there is a substantially infinite impedance between the drain and source leads. To achieve the off condition of the outward transmission gate, the signal on the control lead such as control lead OTGC is made more positive than the peak positive signal voltage coming from hybrid 105. This signal must be greater by at least the value of the pinch-off voltage of the FET. To turn the outward transmission gate on the signal on lead OTGC must be equal to the voltage on the source lead which in the implementation shown is ground due to the properties of operational amplifier 203.

Conclusion

It should be understood that the implementation shown is but one of many and in fact the outward transmission gates 202 and 205 could be loop closure devices, such as relay contacts, driven from processor 101 or from any other common control circuit or local control circuit or processor and that hybrid 105 need not be present if the local switching network were to be four-wire operation throughout. It should be noted, of course, that one skilled in the art may rearrange and utilize our invention without departing from the spirit and scope of what we claimed.

The transmission gates in the transmission circuit may be used to control stability of the hybrid circuits when they are in the unconnected state. This may become important in some situations to prevent crosstalk and high amplitude oscillations.

We claim:

1. In a communication system having a plurality of stations, said stations having MF digital signaling capability, a plurality of Central Office (CO) communication lines, a network communications link for interconnecting selected ones of said stations and said CO lines,
   means in said communication system common to a group of said stations for receiving MF digit signals from said stations,
   common control means for concurrently connecting said MF signals receiving means, a calling station and a CO line to said network communication link,
   said common control means cooperatively associated with said MF receiving means and including means for providing dial pulse signals representative of each MF digit signal received from a connected calling station to said CO line,
   means including a first transmission gate controlled by said common control means and responsive to the initiation of said MF digit signaling from said station for inhibiting communication transmission to said CO line from said connected station for the duration of said MF dialing interval, while still providing said dial pulse signals to said CO line,
   means including a second transmission gate controlled by said common control means and operative during the transmission of said dial pulses to said CO line for inhibiting transmission from said CO line during said dial pulse transmission interval, and
   for allowing transmission from said CO line to said connected station when a break in MF dialing is detected so as to allow the passage from said CO line to said station of any signals on said CO line.

2. The invention set forth in claim 1 wherein there is interposed between said CO line and said network communication link an interface circuit, said interface circuit having included therein said first and second transmission gates, said transmission gate also including a transformer a first winding thereof connected to said CO line and a second winding of said transformer connected to a hybrid, said hybrid arranged to convert from two-wire to four-wire operation, and wherein said first transmission gate is inserted in one leg of said four-wire circuit and said second transmission gate is inserted in the other leg of said four-wire circuit.

3. The invention set forth in claim 2 wherein said dial pulse signal means includes a loop closure device in said interface circuit said closure device being connected on said first winding side of said transformer and operable for establishing open and closed conditions with respect to said CO line.

4. The invention set forth in claim 2 wherein said first and second transmission gates each include a field effect transistor and an amplifier, said FET controllable by signals provided from said common control means to open and close transmission through the associated gate.

5. A transmission control circuit for use in a local communication system arranged to serve a fixed number of stations, said stations having tone digit signaling capability, said communication system having capability of signaling, over the transmission leads, to other communication systems,
   means in said local communication system for receiving tone signals from said stations, and for converting said received tone signals into pulse signals
   common control means for connecting said stations to the transmission leads extending to said other communication systems,
   an interface circuit for applying said pulse signals to said other communication system, said interface circuit including,
   means for separating the inward and outward transmission capability of said transmission leads
   means for inhibiting outward transmission over said transmission leads from said station to said other communication system for the duration of any set of tone signals received from said station,
   means for inhibiting inward transmission from said other communication system during the actual application of said pulse signals on said transmission leads, and wherein said common control means is operative
   for restoring only said inward transmission during any momentary break in said application of pulse signals so as to allow the passage of transmission from said other communication system to said station during said momentary pulse signal break.

6. The invention set forth in claim 5 wherein each said inhibiting means includes a transmission gate operable from signals provided from said common control means.

7. The invention set forth in claim 6 wherein said applying means includes a loop electrical closure device associated with said transmission leads to said other communication system, said device operable for opening and closing said transmission leads so as to apply said pulse signals to said transmission leads.

8. The invention set forth in claim 7 further including a transformer one winding of which is connected to said transmission leads through said loop closure device, and the other winding of which is connected to said transmission separating means.

9. A circuit (103) interposable between a local switching network and a central office line, said local switching network having multifrequency dialing capabilities as well as rotary dial pulse generating capabilities, and having conversion capability for converting generated multifrequency signals to dial pulse equivalent signals, said circuit having a first bidirectional transmission path portion (114-1, 114-n) communicating with said local switching network and a second bidirectional transmission path portion (T, R) communicating with said central office line and a pair of unidirectional transmission path portions (105, 106, 107, 108) connecting said first and second bidirectional transmission path portions,
   said local switching network generating control signals (OTGC, ITGC, 101) in response to multifrequency digit tone signaling appearing on said first bidirectional transmission path
   CHARACTERIZED IN THAT
   means (201, 205) are responsive to said control signals to disable both of said unidirectional transmission paths for the duration of a first predetermined interval of time, said means further arranged to restore in response to further control signals, one of said unidirectional paths before the expiration of said first interval of time, but not during the rotary dial pulsing of a digit, and then for restoring, in response to additional control signals, the other of said unidirectional paths after the completion of a second predetermined interval of time after the expiration of said first predetermined interval of time.

* * * * *